US012783846B2

(12) United States Patent
Marmugi et al.

(10) Patent No.: US 12,783,846 B2
(45) Date of Patent: Nov. 3, 2026

(54) ELECTRONIC ANTENNA MODULE OPTIMISED FOR A CHIP CARD WITH A DUAL COMMUNICATION INTERFACE

(71) Applicant: SMART PACKAGING SOLUTIONS, Rousset (FR)

(72) Inventors: Sebastien Marmugi, Rousset (FR); Stephan Danler Baumgartner, Rousset (FR); Guillaume Gerin, Rousset (FR)

(73) Assignee: Smart Packaging Solutions, Rousset (FR)

( * ) Notice: Subject to any disclaimer, the term of this patent is extended or adjusted under 35 U.S.C. 154(b) by 207 days.

(21) Appl. No.: 17/789,835

(22) PCT Filed: Dec. 30, 2020

(86) PCT No.: PCT/FR2020/000285

§ 371 (c)(1),
(2) Date: Jun. 29, 2022

(87) PCT Pub. No.: WO2021/136890

PCT Pub. Date: Jul. 8, 2021

(65) Prior Publication Data

US 2024/0185020 A1 Jun. 6, 2024

(30) Foreign Application Priority Data

Dec. 31, 2019 (FR) ...................................... 1915792

(51) Int. Cl.
*G06K 19/077* (2006.01)

(52) U.S. Cl.
CPC . *G06K 19/07783* (2013.01); *G06K 19/07769* (2013.01)

(58) Field of Classification Search
CPC .................. G06K 19/07783; G06K 19/07769
See application file for complete search history.

(56) References Cited

U.S. PATENT DOCUMENTS 4,789,776 A * 12/1988 Inoue ............... G06K 19/07747 235/487
4,818,853 A * 4/1989 Ohta ................ G06K 19/07779 235/492

(Continued)

FOREIGN PATENT DOCUMENTS

DE 102013102052 A1 9/2014

OTHER PUBLICATIONS

International Search Report (PCT/ISA/210) with translation and Written Opinion (PCT/ISA/237) mailed on Mar. 15, 2021, by the European Patent Office as the International Searching Authority for International Application No. PCT/FR2020/000285. (11 pages).

(Continued)

*Primary Examiner* — Thien M Le
*Assistant Examiner* — Asifa Habib
(74) *Attorney, Agent, or Firm* — McDonnell Boehnen Hulbert & Berghoff LLP

(57) ABSTRACT

The invention relates to an electronic module for a chip card, comprising a substrate having, on a first face, a terminal block of electrical contacts that are standardized according to the ISO 7816 standard enabling an operation by contact with the corresponding contacts of a chip card reader and connection sinks positioned opposite the standardized contacts, the substrate comprising, on a second face, an antenna and a microelectronic chip protected by an encapsulation zone and provided with a communication interface with contact and a contactless communication interface provided with two terminals intended to be connected to the two ends of an antenna of the electronic module arranged inside the encapsulation zone, wherein the antenna comprises at least two separate and non-concentric spiral windings, arranged such that none of the spiral windings surrounds the set of connection sinks of the module.

17 Claims, 5 Drawing Sheets

(56) References Cited

U.S. PATENT DOCUMENTS

| | | | | |
|---|---|---|---|---|
| 5,710,458 | A * | 1/1998 | Iwasaki | G06K 19/07749 257/679 |
| 5,773,812 | A * | 6/1998 | Kreft | G06K 19/07769 235/487 |
| 6,313,524 | B1 * | 11/2001 | Pueschner | G06K 19/07743 29/841 |
| 6,686,650 | B1 * | 2/2004 | Gogami | G06K 19/07749 257/781 |
| 10,860,914 | B1 * | 12/2020 | Osborn | G06K 19/07722 |
| 11,755,873 | B1 * | 9/2023 | Finn | G06K 19/07749 235/492 |
| 2005/0212690 | A1 * | 9/2005 | Nishikawa | G06K 19/07732 340/932.2 |
| 2006/0049266 | A1 * | 3/2006 | Nakajima | G06K 19/07758 235/492 |
| 2008/0245879 | A1 * | 10/2008 | Artigue | G06K 19/07743 235/492 |
| 2009/0085133 | A1 | 4/2009 | Doan | |
| 2010/0019038 | A1 * | 1/2010 | Puente Baliarda | G06K 19/077 235/492 |
| 2010/0066619 | A1 * | 3/2010 | Furumura | B42D 25/00 343/742 |
| 2010/0141465 | A1 * | 6/2010 | Le Garrec | G06K 19/07794 307/104 |
| 2010/0176205 | A1 * | 7/2010 | Patrice | G06K 19/072 235/492 |
| 2011/0266351 | A1 * | 11/2011 | Wagner | G06K 19/07722 438/108 |
| 2013/0140370 | A1 * | 6/2013 | Finn | G06K 19/077 29/601 |
| 2013/0146670 | A1 * | 6/2013 | Grieshofer | G06K 19/07769 174/266 |
| 2013/0181056 | A1 * | 7/2013 | Itay | G06K 7/10108 235/492 |
| 2014/0014732 | A1 * | 1/2014 | Finn | G06K 19/07783 235/492 |
| 2014/0184462 | A1 * | 7/2014 | Yosui | H01Q 7/06 343/788 |
| 2015/0041546 | A1 * | 2/2015 | Herslow | G06K 19/02 428/338 |
| 2015/0129665 | A1 * | 5/2015 | Finn | B23K 26/21 235/492 |
| 2015/0136858 | A1 * | 5/2015 | Finn | B23K 26/361 235/492 |
| 2015/0269476 | A1 * | 9/2015 | Calvas | G06K 19/07754 235/492 |
| 2015/0294213 | A1 * | 10/2015 | Ziemkus | G06K 19/07747 257/679 |
| 2015/0339565 | A1 * | 11/2015 | Pueschner | G06K 19/07722 235/488 |
| 2016/0104064 | A1 * | 4/2016 | Mizoguchi | G06K 19/07747 438/3 |
| 2016/0183377 | A1 * | 6/2016 | Ottobon | G06K 19/07747 29/829 |
| 2016/0267371 | A1 * | 9/2016 | Hosaka | G06K 19/0772 |
| 2016/0330841 | A1 * | 11/2016 | Le Loc'H | G06K 19/07747 |
| 2016/0353619 | A1 * | 12/2016 | Kato | G06K 19/07 |
| 2017/0077590 | A1 * | 3/2017 | Calvas | G06K 19/07722 |
| 2017/0206448 | A1 | 7/2017 | Pueschner et al. | |
| 2017/0243101 | A1 * | 8/2017 | Geissinger | G06K 19/077 |
| 2017/0293833 | A1 * | 10/2017 | Pohl | G06K 19/07775 |
| 2018/0108595 | A1 * | 4/2018 | Gac | G06K 19/07739 |
| 2019/0086968 | A1 * | 3/2019 | Yun | G06F 1/1626 |
| 2019/0340398 | A1 * | 11/2019 | Mosteller | G06K 7/10366 |
| 2020/0258831 | A1 * | 8/2020 | Saiyajitara | G06K 19/07747 |
| 2020/0394484 | A1 * | 12/2020 | Calvas | G06K 19/07749 |
| 2021/0049439 | A1 * | 2/2021 | Finn | G06K 19/07354 |
| 2021/0056374 | A1 * | 2/2021 | Lotya | H04B 5/77 |
| 2021/0073608 | A1 * | 3/2021 | Finn | B21D 5/16 |
| 2021/0192311 | A1 * | 6/2021 | Lotya | G06K 19/07747 |
| 2022/0076092 | A1 * | 3/2022 | Kim | G06K 19/07747 |
| 2022/0147785 | A1 * | 5/2022 | Placitelli | G06K 19/07733 |
| 2022/0366207 | A1 * | 11/2022 | Thorsell | G06K 19/07758 |
| 2023/0006352 | A1 * | 1/2023 | Koujima | G06K 19/07783 |
| 2023/0137393 | A1 * | 5/2023 | Lotya | G06K 19/07783 29/850 |
| 2023/0274123 | A1 * | 8/2023 | Yeap | G06K 19/07754 343/895 |
| 2023/0297805 | A1 * | 9/2023 | Yee | G06K 19/07354 705/76 |
| 2023/0307833 | A1 * | 9/2023 | Ratni | H01Q 5/25 |
| 2023/0395966 | A1 * | 12/2023 | Shimada | H01Q 9/285 |
| 2024/0111981 | A1 * | 4/2024 | Ali | B42D 25/373 |
| 2024/0290747 | A1 * | 8/2024 | Kaneko | G06K 19/07747 |

OTHER PUBLICATIONS

All documents in *Smart Packaging Solutions SA* v. *Perfect Plastic Printing Corp.*, D. DE, filed by plaintiff or entered into the file wrapper by district court.

All documents in *Smart Packaging Solutions SA* v. *CPI Card Group Inc.*, D. DE filed by plaintiff or entered into the file wrapper by district court.

All documents in IPR2022-00235 submitted by Patent Owner or issued by the Patent Trial and Appeal Board.

All documents in IPR2022-00417 submitted by Patent Owner or issued by the Patent Trial and Appeal Board.

All documents in IPR2022-00650 submitted by Patent Owner or issued by the Patent Trial and Appeal Board.

All documents in IPR2022-00951 submitted by Patent Owner or issued by the Patent Trial and Appeal Board.

* cited by examiner

[Fig 1A]
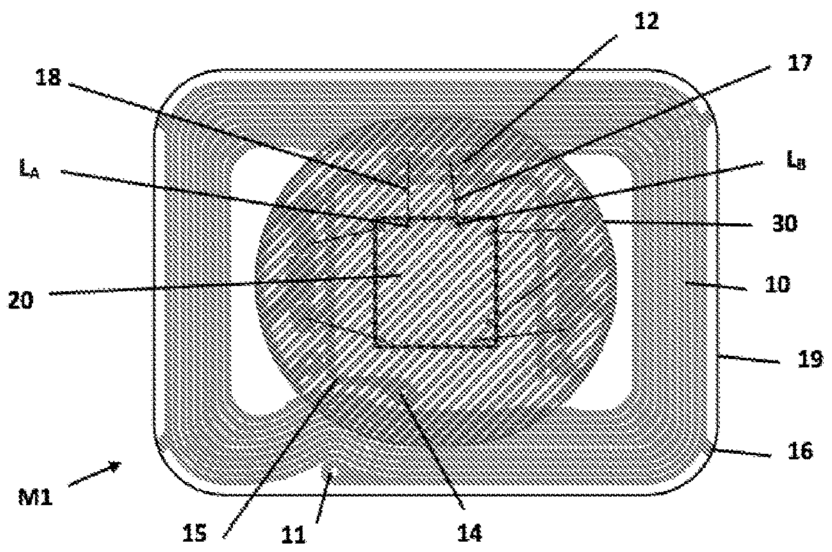
[Fig 1B]
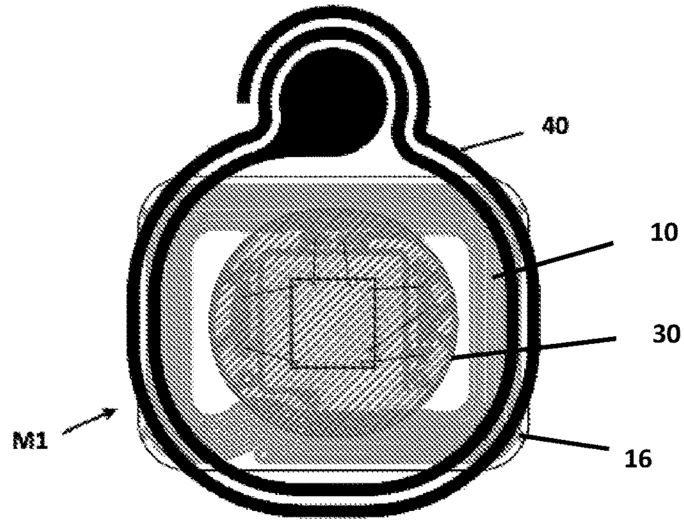
[Fig 1C]
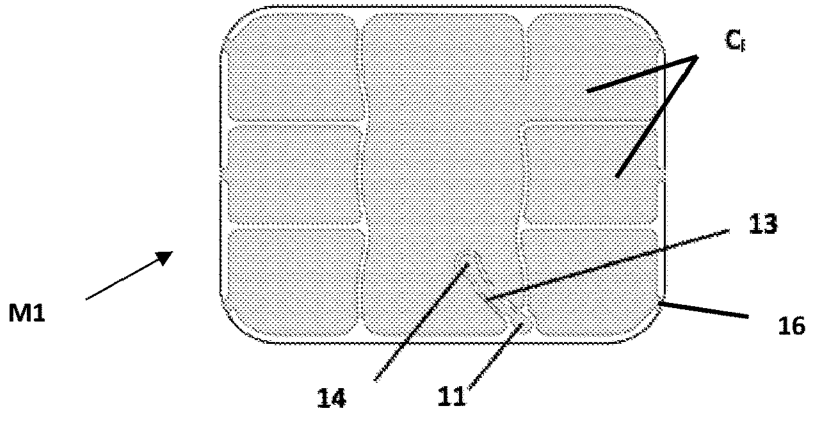

[Fig 2A]
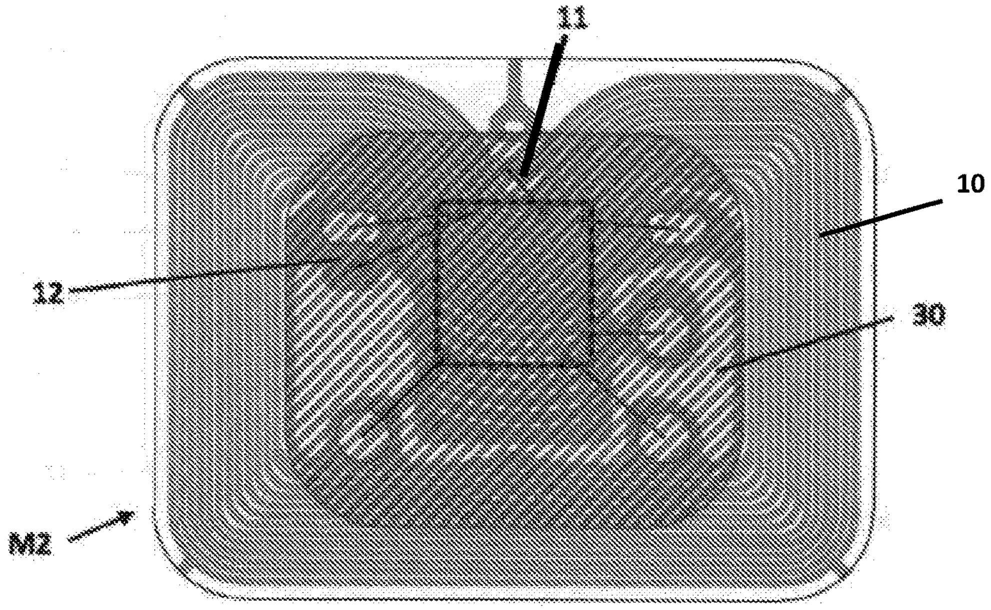
[Fig 2B]
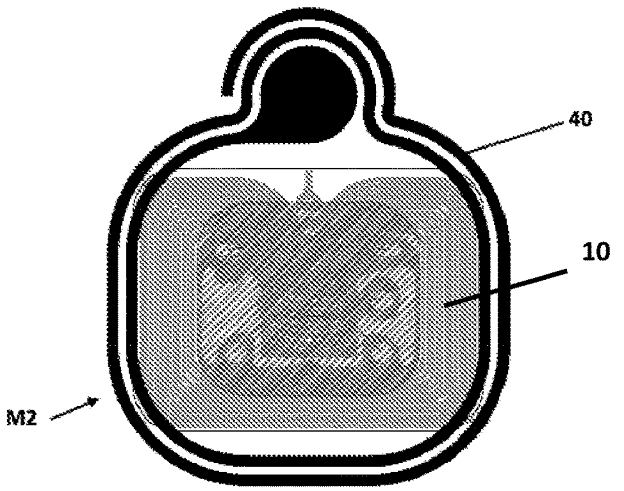
[Fig 2C]
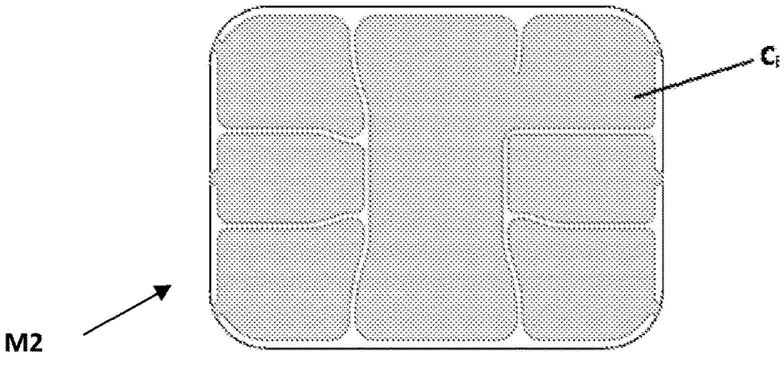

[Fig 3A]
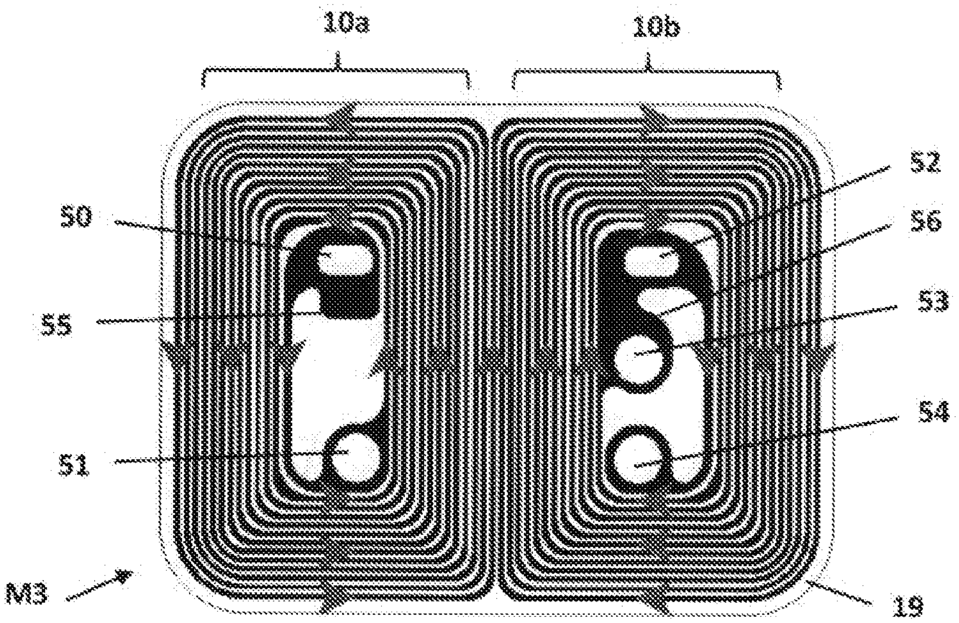
[Fig 3B]
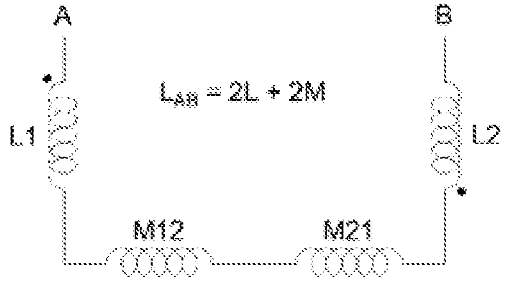
[Fig 3C]
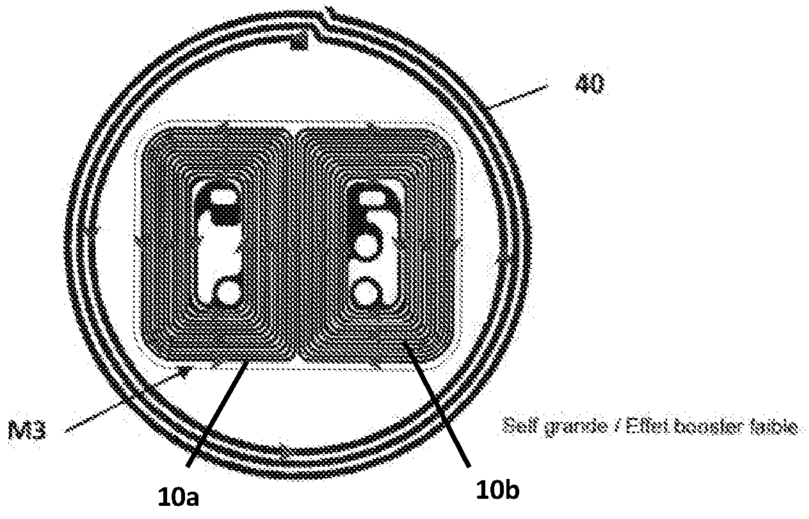

[Fig 4A]
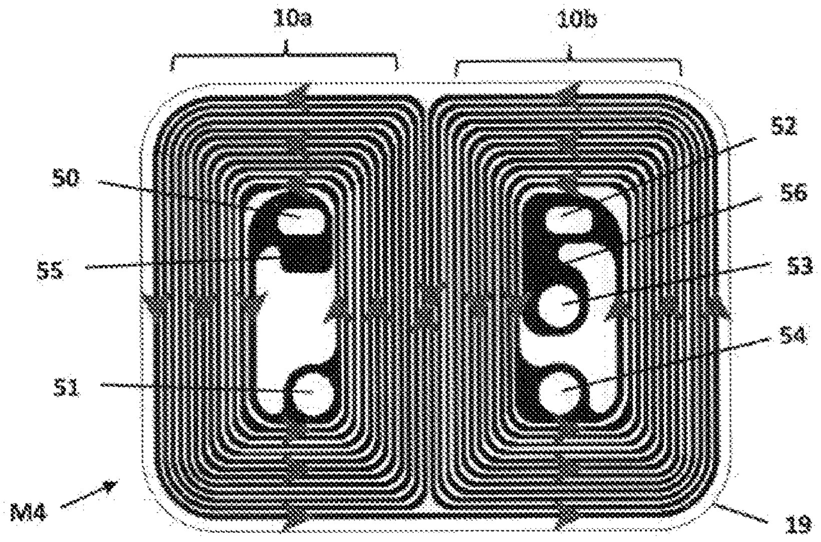
[Fig 4B]
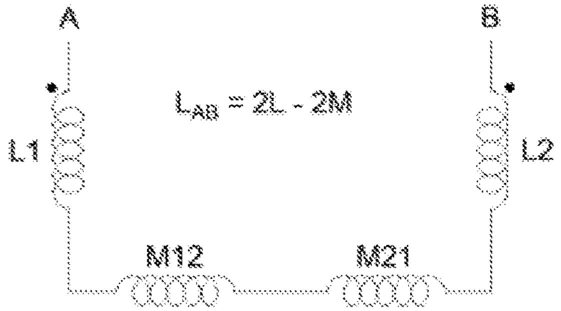
[Fig 4C]
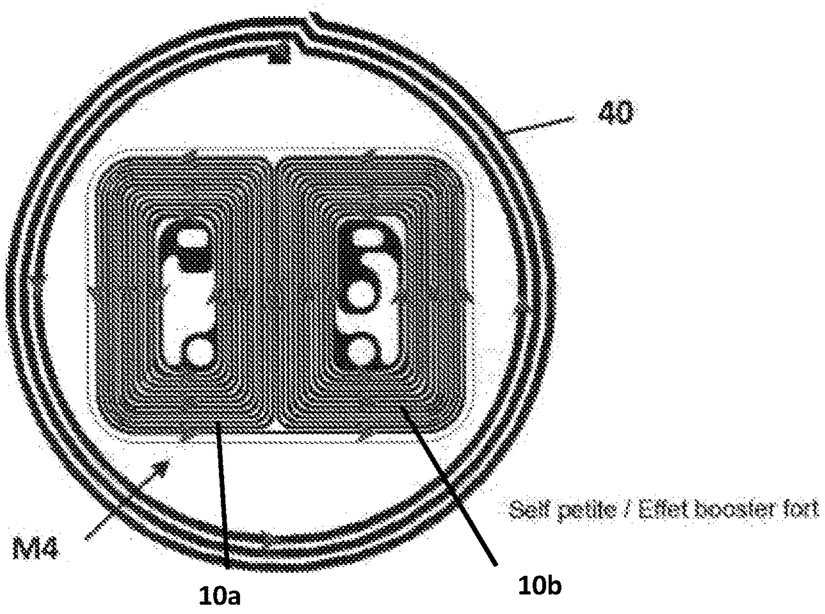

[Fig 5A]
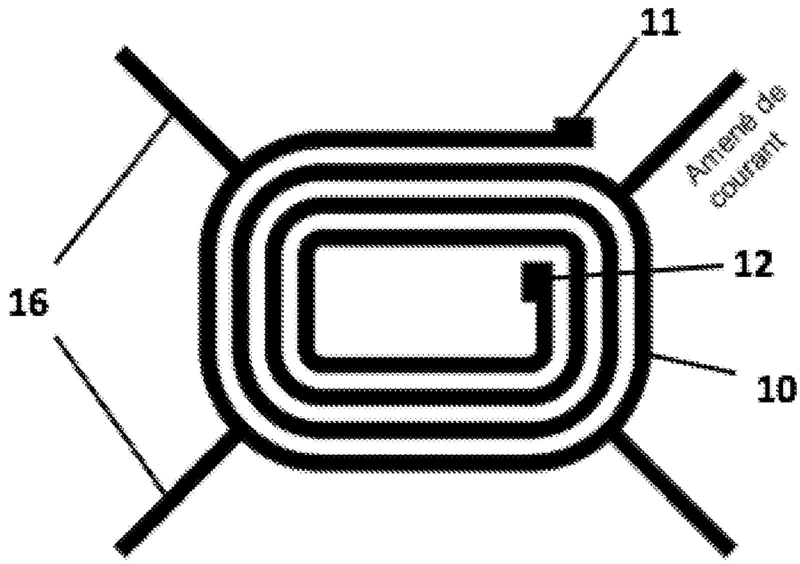
[Fig 5B]
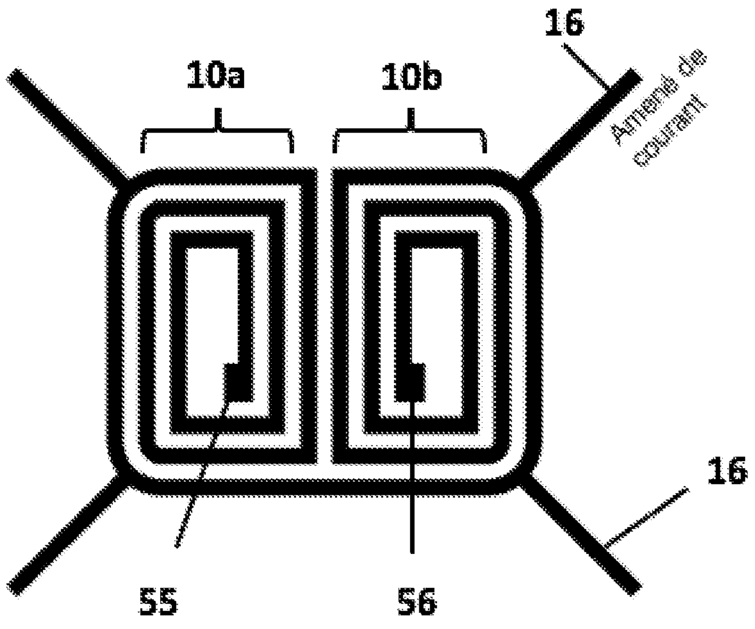

ELECTRONIC ANTENNA MODULE OPTIMISED FOR A CHIP CARD WITH A DUAL COMMUNICATION INTERFACE

The invention relates to an electronic module with a contact and contactless dual communication interface, and a chip card incorporating such a module.

PRIOR ART

Contact and contactless hybrid chip cards already exist in the prior art. The majority have a microelectronic module provided, on the one hand, with standardized contacts according to the ISO 7816-2 standard corresponding to the contacts of a chip card reader and, on the other hand, with a radio-frequency communication interface which is provided with at least one antenna and able to communicate with the antenna of a contactless reader.

When the chip card comprises an antenna produced in the body of the card, it is sometimes directly connected to the contactless interface of the microelectronic module, and this mechanical connection between the antenna and the module then induces losses in terms of reliability or manufacturing output. Specifically, the mechanical and thermal stresses imposed on the card during its use can cause breaks in the connection between the module and the antenna, or large increases in the electrical resistance of this connection, causing a loss in terms of the performance of the card over its use.

This is why use has increasingly often been made of modules for chip cards with a dual communication interface, comprising a small antenna located directly on the module, and a second antenna of larger size located in the card body, also called a booster antenna, which is coupled with the antenna of the module but not physically connected to it.

In this case, in order to manufacture a chip card it suffices merely to transfer the module with a dual communication interface into a chip card body, this being easy to do at low cost and with a high degree of reliability with the majority of conventional chip-implanting machines used for manufacturing contact chip cards.

However, new problems have appeared. Thus, as modules with a dual communication interface possess metal contacts on their upper face, and a microelectronic chip as well as the tracks of the antenna of the module located on their lower face, electrically connecting the terminals of the chip to the contacts and the antenna has made it necessary to produce metalized vias producing an electrical connection between the two faces of the module, with higher production costs as a result.

An example of such a module is described in the document US 2014/0014732 A1, in which the module comprises a plurality of antenna segments forming bands which overlap, connected by vias.

In order to solve this problem, provision has been made to move the two ends of the antenna of the module inside the area encapsulating the chip. In this way, the terminals of the chip could be connected both to the ISO contacts and to the terminals of the antenna of the module, inside the droplet encapsulating the chip, without vias being necessary.

In contrast, in order to avoid crossing wires and therefore short-circuits, it has been necessary to divert the band of turns of the antenna of the module in order to guide it in part in the encapsulating area, in the form of a bulge in the band of turns bypassing the distal end of the antenna (namely the end of the outer turn of the antenna of the module). However, this arrangement requires a droplet of resin coating the chip of a larger size, and longer wiring cables between the antenna and the chip. This is therefore incompatible with existing chip-implanting machines, manufacturing modules provided with an antenna with a localized bulge requires new machines, this causing extra cost. Furthermore, the larger size of the coating resin droplet makes it necessary to distance the turns of the booster antenna, this possibly causing drops in the radio-frequency performance of the chip card equipped with such a module.

In addition, another problem linked to the method for manufacturing the antenna of the module has been found. The antenna of the module is typically obtained by metalizing the substrate using current guide tracks. It has been found that the quality of the metalization obtained depends on the length of the turns of the antenna. In particular, with known antennas, the end of the antenna which is most distanced from a current guide is less well metalized than the other end, this possibly causing a quality defect in the connection of the antenna to one of the terminals of the contactless interface of the chip.

AIMS OF THE INVENTION

A general aim of the invention is consequently to propose an electronic module with a contact and contactless dual communication interface, which is free of the aforementioned drawbacks.

A specific aim of the invention is to propose an electronic module for a chip card having a structure which is able to solve the contradictory problems expounded above, and particularly to propose a module which is free of vias and of a localized bulge in the turns, in order to be able to retain a coating droplet of small dimensions.

SUMMARY OF THE INVENTION

In principle, the invention provides for a new design of the antenna of the module. The antenna of the module is designed in the form of two half-antennas which are produced by two windings of turns instead of a single one, and these windings are each arranged so as to surround one of the ends of the antenna and some of the connection wells between the contacts of the module and terminals of the chip, so as to have a band of turns which passes between the connection wells.

One subject of the invention is consequently an electronic module for a chip card, comprising a substrate having, on a first face, a terminal block of standardized electrical contacts according to the ISO 7816 standard allowing operation by means of contact with the corresponding contacts of a chip card reader and connection wells positioned opposite said standardized contacts, said substrate comprising, on a second face, an antenna, and a microelectronic chip which is protected by an encapsulating area and provided with a contact communication interface and a contactless communication interface which is provided with two terminals which are intended to be connected to the two ends of an antenna of the electronic module which are arranged inside the encapsulating area, characterized in that the antenna of the module comprises two distinct windings of turns extending between its two ends, these two windings being configured so that a first winding of turns starts from a first end, is wound around first connection wells and joins the second winding of turns, which is wound around second connection wells and extends as far as the second end of the antenna.

This arrangement ensures that the two distinct and non-concentric windings of turns of the antenna are arranged so that neither of said windings of turns surrounds all of the connection wells of the module which are connected to the standardized contacts and the chip.

According to one embodiment of the module, said windings are coplanar.

According to one embodiment, the two windings of turns are connected in series and are wound in the same direction. In this case, the electric current of the antenna flows in the same direction through the turns of the antenna which are located between said first connection wells and said second connection wells.

According to another embodiment, the two windings of turns are connected in series and are wound in opposite directions. In this case, the electric current of the antenna flows in opposite directions through the turns of the antenna which are located between said first connection wells and said second connection wells.

According to one embodiment, the inductance L of the antenna is between 1 and 2.3 microhenries and the chip has a capacitance of between 17 and 70 picofarads.

Another subject of the invention is a chip card with a contact and contactless dual communication interface, characterized in that it comprises an electronic module which has the above features.

Other features and advantages of the invention will become apparent upon reading the detailed description and the appended drawings, in which:

FIGS. 1A, 1B and 1C are plan views of an electronic module with a dual communication interface which is in accordance with the prior art, provided with vias;

FIGS. 2A, 2B and 2C are plan views of another electronic module which is in accordance with the prior art, free of vias but provided with a bulge in the turns of the antenna;

FIGS. 3A to 3C show a first embodiment of the electronic module according to the invention;

FIGS. 4A to 4C show a second embodiment of the electronic module according to the invention;

FIG. 5A schematically shows the current guides for metalizing an electronic module antenna according to the prior art;

FIG. 5B schematically shows the metalization of an electronic module antenna in accordance with the invention.

DETAILED DESCRIPTION

FIG. 1 corresponds to a first embodiment of an electronic module M1 for a chip card in accordance with the prior art. The module M1 comprises an antenna 10 and a microelectronic chip 20, which is shown in transparency through an encapsulating droplet 30 protecting the microelectronic chip 20. The antenna 10 comprises a set of turns extending between a distal end 11, which is the end of the outer turn, and a proximal end 12, which is the end of the inner turn. The proximal end 12 of the antenna is connected by a connecting wire 17 to a connection pad LB of the contactless interface of the chip 20. The distal end 11 of the antenna 10 is located outside the area protected by the encapsulating resin droplet 30. It is guided to a connection 14 located inside this encapsulating droplet by a connection 13 which can be seen on the front face of the module and forms a bridge over the turns of the antenna, as is shown in FIG. 1C. This requires the connections 11 and 14 to be produced in the form of metal vias passing through the substrate 19 of the module, this being costly from an industrial point of view. A further result of this is that not only the standardized contacts $C_i$, but also the connection 13 in the form of a bridge, can be seen on the front face of the module, this not really being accepted by the market.

FIG. 1B shows the module M1 of FIG. 1A, seen from the side of the antenna and the encapsulating droplet, with a superimposed depiction of the booster antenna 40, which is incorporated into the card body (which is not shown). The encapsulating resin 30, because of its thickness, needs to be placed in a deeper chip-implanting cavity than the one reserved for the contour of the module. Thus, the cavity receiving the resin 30 encapsulating the module risks cutting off turns of the booster antenna 40. Because of this, the booster antenna 40 must be located around this deep cavity and distanced enough to take into account the production machining tolerances.

From an industrial point of view, the turns of the antenna 10 are formed by metalization starting from current guides 16 located at the four corners of the module.

In order to avoid the aforementioned problems linked to the presence of the vias 11, 14 and the bridge 13, a modified module M2 has been proposed in the prior art, as shown in FIGS. 2A to 2C.

In this configuration, the proximal end 12 and the distal end 11 of the antenna 10 are both located in the encapsulating droplet 30, this avoiding the need for vias and a bridge, as can be seen on the front face of the module M2 shown in FIG. 2C. However, incorporating the two antenna ends 11, 12 into the encapsulating droplet 30 requires the latter to be larger than in the preceding embodiment (FIG. 1), this requiring the use of specific chip-implanting machines. Furthermore, as can be seen in FIG. 2B, the manufacturing tolerances for the cavity of the module require the turns of the booster antenna 40 to be more separated from the turns of the antenna 10 of the module, this damaging the radio-frequency performance of this module.

In order to simultaneously solve the various technical problems raised, the invention proposes the embodiments of FIGS. 3 to 5.

FIG. 3A describes a first embodiment of the invention. The antenna 10 of the module now comprises two distinct windings connected in series and labeled 10*a*, 10*b*. The first winding 10*a* starts at its end 55, surrounds two connection wells 50, 51 (or bonding wells) on the left-hand portion of the module M3 and is continued by the second winding 10*b*, which surrounds three connection (bonding) wells 52, 53, 54 of the right-hand portion of the module M3 and ends at the end 56 of the second winding 10*b*.

It is recalled that a connection or bonding well is a hole in the substrate 19 of the module which is opposite an ISO 7816 contact located on the other face of the module. During the phase of wiring the chip of the module, a connecting wire is arranged starting in general from the chip, descending through the connection well and being welded to the back of an ISO 7816 contact so as to ensure an electrical connection between this ISO contact and a terminal of the contact interface of the chip.

In this instance, the connection wells allow the connection between the ISO contacts of the front face of the module and the following terminals of the chip:

50: GND (ground)

51: I/O (communication signal)

52: VCC (electric power supply)

53: RST (reset)

54: CLK (clock).

Starting from its end 55, the winding 10*a* is wound in the counter-clockwise direction around its end 55 and the connection wells 50, 51, then it is extended by the winding 10*b*, which is wound in the clockwise direction around the connection wells 52, 53, 54 and its end 56.

It follows that, in the area of the two windings of the antenna which is located between the connection wells, the electric currents which flow through the two windings 10*a*, 10*b* of the antenna flow in the same direction and, through the turns of the windings 10*a*, 10*b* located outside the connection wells, the electric currents flow in the opposite direction, as schematically shown by the arrows on the turns of the windings 10*a*, 10*b*.

The two windings 10*a*, 10*b* correspond to two inductors L1 and L2 placed in series, as shown in the equivalent circuit diagram of FIG. 3B, and the current flows in the same direction through these two inductors.

Thus, the total value of the inductance $L_{AB}$ between the two points A and B corresponds to the sum of the two inductors L1 and L2 in series, to which the value of the mutual inductances of L2 on L1 (labeled M21) and L1 on L2 (labeled M12) is added.

In diagram 3B, L1 and L2 have the same value L and are placed symmetrically, the mutual inductances are equal to M, and the total inductance value is therefore obtained, which is $L_{AB}$=2L+2M.

The inductance of the module is an important factor in obtaining a technology of dual cards with effective inductive coupling. The chips 20 used have capacitances varying from 17 pF up to about 70 pF. The prior art demonstrates that a module the resonant frequency of which was slightly below 20 MHz gave good radio-frequency performance and allowed a system composed of a booster antenna and a module resonating at these frequencies to be able to be in accordance with all the ISO and EMVCo specifications bearing on transactions with contactless chip cards.

It therefore becomes vital for a module to have a sufficient inductance value, that is to say above 1 μH.

FIG. 3C shows the portion 40 of the booster antenna which is present in the card body, and which is substantially of the same size as the antenna 10 of the module. When the current flowing through the antenna 40 of the booster is shown, it is observed that the direction of the current through the booster antenna 40 is identical to that of the module M3 in the left-hand portion of the antenna 40, and opposite in the right-hand portion of the latter. If attention is paid to the top and bottom portions of the module, the current through the antenna 40 of the booster is in the same direction as the current through the winding 10*a* of the module, and in the opposite direction to that of the current through the winding 10*b* of the module. A result of this is that, despite the fact that the resonant frequency of the module is optimized, because of the different current directions through these two windings, this embodiment will not yield performance which is sufficient for an inductive coupling technology which is capable of passing all the ISO and EMVCo tests of contactless cards.

FIG. 4A is similar to FIG. 3A and describes an advantageous embodiment of the invention which corrects the problems raised in the description of FIG. 3C. This time, the winding 10*b* of the antenna 10 is wound in the same direction as the winding 10*a*. It follows that, in the area of the antenna located between the connection wells 50, 51, on the one hand, and 52, 53, 54, on the other hand, the electric currents which flow through the two windings 10*a*, 10*b* of the antenna flow this time in opposite directions, as schematically shown by the arrows on the turns located between the two sets of connection wells. The total inductance of the antenna 10 of the module M4 will be reduced by the dual mutual inductance of L1 on L2 and L2 on L1. With the same assumptions as for the module M3 of FIG. 3, a value equal to $L_{AB}$=2L−2M will therefore be obtained for the total inductance of the antenna 10 of the module, as mentioned in the diagram of FIG. 4B.

FIG. 4C shows the same type of diagram as FIG. 3C. Now it can be seen that all the directions of rotation of the currents through the outer tracks of the windings 10*a*, 10*b* which neighbor those of the antenna 40 of the concentrator go in the same direction as the current through the small antenna 40 of the concentrator, as schematically shown by the arrows on the tracks. Thus, in the upper portion of diagram 4C all the currents go from right to left, in the lower portion the currents (that of the concentrator 40 and those of the windings 10*a* and 10*b* of the antenna 10 of the module) go from left to right, in the left-hand portion the currents go from top to bottom and in the right-hand portion the currents go from bottom to top.

Consequently, the embodiment of FIG. 4 yields maximum effectiveness: this system consisting of the booster antenna 40 coupled to the module antenna 10*a*, 10*b* of FIG. 4A yields sufficient performance for the inductive coupling technology to be capable of passing all the ISO and EMVCo tests of contactless chip cards.

It should be noted that the embodiments of FIGS. 3 and 4 make use of a module antenna 10 consisting of two windings 10*a*, 10*b*, but these are only the most simple examples. The principle of the invention extends to windings comprising more windings, and other forms of antenna.

The structure of a module antenna 10 produced from two or more windings 10*a*, 10*b* such as is described above also makes it possible to solve the problem of the insufficient metalization of the antenna ends.

As shown in FIG. 5A, known module antennas 10 comprise a single winding located between the distal end 11 and the proximal end 12 of the antenna 10. In order to produce such an antenna, it is known practice to metalize the substrate 19 of the module using current guide tracks 16. In order to reach the proximal end 12, the metalization current must travel the whole length of the antenna 10. It can be clearly seen that the distal end 11 is located much closer to the current guides 16 than the proximal end 12.

In contrast, as can be seen in FIG. 5B, when the module antenna 10 comprises two windings 10*a*, 10*b* the ends 55, 56 of the two windings are located at equal distances from the various metalization current guide tracks 16. The result of this is that the metalization of the antenna ends 55, 56 is not only equal, but also of better quality, this improving the weldability of the ends 55, 56 of the antenna to the module. Furthermore, the distance between the ends 55, 56 and the current guides is substantially divided in two with respect to the preceding scenario, this allowing faster metalization.

Advantages of the Invention

Ultimately, the invention achieves the aims which were set. This structure of a module provided with an antenna with multiple windings makes it possible to obtain a module without vias, and without an area of a bulge in the tracks of the antenna.

Furthermore, the ends of the antenna of the module are located in the vicinity of the bonding wells, consequently the size of the encapsulating resin droplet is smaller, this allowing at once better radio-frequency coupling, shorter wiring cables to the chip, and compatibility of the module with standard chip-implanting tools. Furthermore, as the length of the windings of the module antenna is shorter, this allows more effective metalization.

The invention claimed is:

1. An electronic module for a chip card, comprising a substrate, wherein the substrate comprises:

on a first face, a terminal block of standardized electrical contacts according to the ISO 7816 standard; and on a second face:

first connection wells positioned opposite at least one of said standardized electrical contacts;

second connection wells positioned opposite at least one of said standardized electrical contacts;

an antenna of the electronic module configured to couple or communicate with an external antenna; and a microelectronic chip that is protected by an encapsulating area and provided with a contact communication interface and a contactless communication interface that is provided with two terminals configured to connect to the two ends of the antenna and arranged inside the encapsulating area, wherein the antenna of the module comprises two distinct windings of turns extending between its two ends, these two windings being configured so that a first winding of turns starts from a first end, is wound around the first connection wells and joins the second winding of turns, which is wound around the second connection wells and extends as far as the second end of the antenna, wherein the antenna provides a conductive path on the second face from the first end to the second end, and wherein neither the first end nor the second end of the antenna are electrically connected to any of the electrical contacts of the terminal block, wherein the first connection wells and the second connection wells comprise holes in the substrate through which electrical connections between the terminal block of standardized electrical contacts and the contact communication interface are made, and wherein the electrical connections are configured to facilitate communication between:

contacts of a chip card reader corresponding to the ISO 7816 standard that are in contact with the terminal block of standardized electrical contacts; and the microelectronic chip.

2. The electronic module as claimed in claim 1, wherein said windings of turns are coplanar.

3. The electronic module as claimed in claim 1, wherein the two windings of turns are connected in series and are wound in the same direction.

4. The electronic module as claimed in claim 3, wherein through the turns of the antenna located between said first connection wells and said second connection wells, the electric current of the antenna flows in the same direction.

5. The electronic module as claimed in claim 1, wherein the two windings of turns of the antenna are connected in series and are wound in opposite directions.

6. The electronic module as claimed in claim 5, wherein through the turns of the antenna located between said first connection wells and said second connection wells, the electric current flows in opposite directions.

7. The electronic module as claimed in claim 1, wherein the inductance of the antenna is between 1 and 2.3 microhenries and the chip has a capacitance of between 17 and 70 picofarads.

8. A chip card with a contact and contactless dual communication interface, comprising an electronic module as claimed in claim 1.

9. The electronic module as claimed in claim 1, wherein the electrical connections between the terminal block of standardized electrical contacts and the contact communication interface comprise a connection wire that passes through one of the first connection wells or one of the second connection wells.

10. The electronic module as claimed in claim 9, wherein the connection wire is welded to an ISO 7816 contact of the terminal block of standard electrical contacts according to the ISO 7816 standard.

11. The electronic module as claimed in claim 9, wherein the connection wire is electrically connected to a terminal of the contact communication interface of the microelectronic chip.

12. The electronic module as claimed in claim 11, wherein the terminal of the contact communication interface of the microelectronic chip is a GND (ground) terminal.

13. The electronic module as claimed in claim 11, wherein the terminal of the contact communication interface of the microelectronic chip is a I/O (communication signal) terminal.

14. The electronic module as claimed in claim 11, wherein the terminal of the contact communication interface of the microelectronic chip is a VCC (electric power supply) terminal.

15. The electronic module as claimed in claim 11, wherein the terminal of the contact communication interface of the microelectronic chip is a RST (reset) terminal.

16. The electronic module as claimed in claim 11, wherein the terminal of the contact communication interface of the microelectronic chip is a CLK (clock) terminal.

17. The electronic module as claimed in claim 1, wherein the first winding is not wound around any of the second connection wells, and wherein the second winding is not wound around any of the first connection wells.

* * * * *